J. DICKSON.
Plow.
No. 21,824.
Patented Oct. 19, 1858.
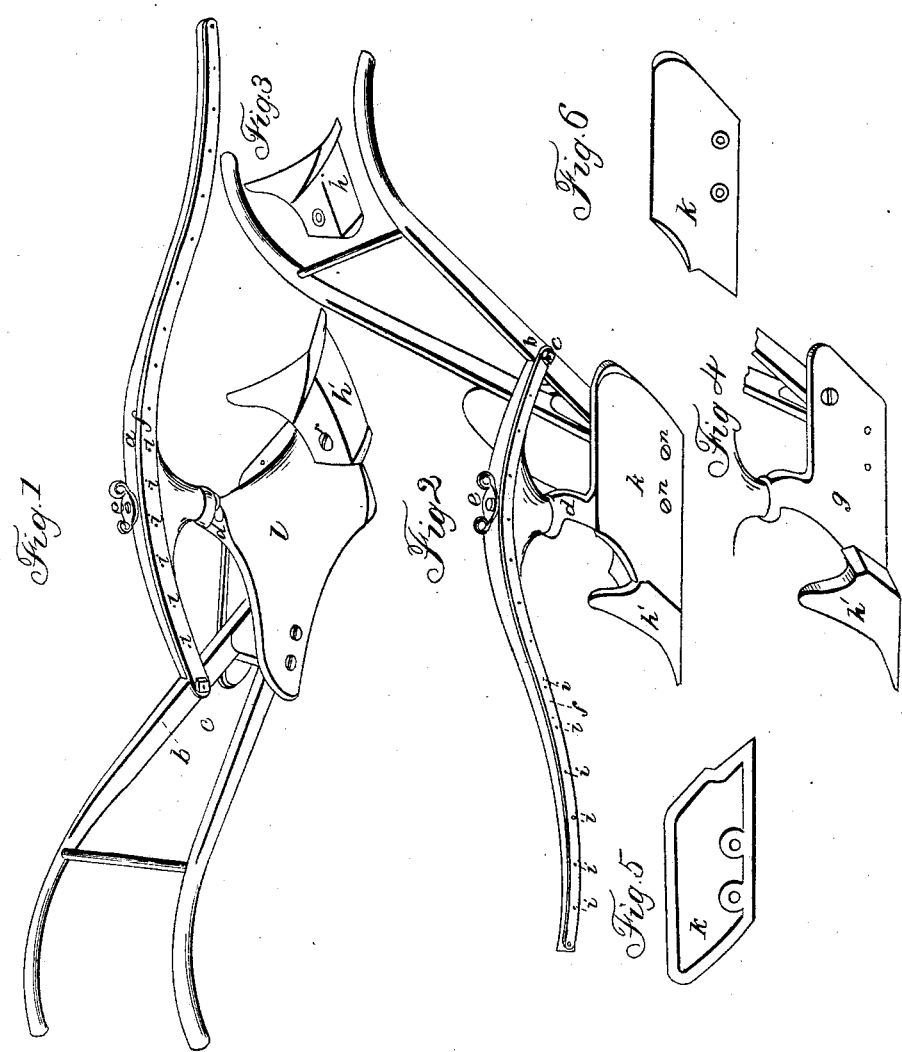

UNITED STATES PATENT OFFICE.

JOHN DICKSON, OF NEW CASTLE, PENNSYLVANIA.

IMPROVEMENT IN PLOWS.

Specification forming part of Letters Patent No. 21,824, dated October 19, 1858.

*To all whom it may concern:*

Be it known that I, JOHN DICKSON, of New Castle, in the county of Lawrence and State of Pennsylvania, have invented a new and useful Improvement in Plows; and I do hereby declare the following to be a full, clear, and exact description thereof, reference being had to the annexed drawings, forming part of this specification, in which—

Figure 1 is a perspective representation of my plow, showing the shape and construction of the beam, and with a large-sized share attached. Fig. 2 is a representation of my plow similarly arranged as in Fig. 1, but seen from the landside. Fig. 4 represents the appearance of the lower part of my plow with a large-sized share when the adjustable landside is removed. Fig. 3 is a small-sized share. Fig. 5 is a view of the inside of the adjustable landside. Fig. 6 is an outside view of the adjustable landside detached.

In the several drawings like letters of reference denote similar parts of my improved plow.

My improvement consists in the use of a double landside or landsides for increasing the size and weight of the plow, the share being removed, when the plow is altered by the removal or addition of the double landside and a smaller or larger share attached, as the decreased or increased size of the plow requires.

To enable others skilled in the art to make and use my improvement in plows, I will proceed to describe its construction and operation.

In the drawings, Figs. 1 and 2, $a$ is the beam of the plow, which is attached at one end to one of the handles $b$ by a screw-bolt, $c$, and to the stock $d$ of the plow by a king-bolt, $e$, in the usual manner. The beam of plows is usually made entirely of wood or of iron. The iron beam has been preferred, not only for its superior strength, but because it admits of the beam being so curved as to give room above the horn of the share, which prevents its being choked without raising the point of the beam, which would injure the draft of the plow. This curvature cannot be given to a wooden beam without weakening it, as the line of curvature would cross the grain of the wood and render it liable to break at the very point where it should be capable of enduring the greatest strain.

To obviate this difficulty and allow of plows being made with tight wooden beams of sufficient curvature is one of the purposes of my invention.

I make my beam $a$ of wood, of the shape shown in the drawings, Figs. 1 and 2, with any degree of curvature which may be desired, and on either side of the beam I place a strap of wrought-iron, $f$, curved, of the same shape as the wooden beam. These straps $ff$—one on each side of the beam—are fastened to it by rivets or bolts $i\ i$ 10. Thus the wooden beam may be made very light, and, notwithstanding the curvature, will be as strong and firmer than a beam of wrought-iron.

The second feature of my improvement is designed to allow of a plow being made heavy or light at pleasure.

In the several drawings, $d$ is the stock of the plow.

$g$, Fig. 4, is the landside, which may be made of one piece with the stock.

$h$, Fig. 3, is a small-sized share, which fits the stock of the plow when the double landside $k$ is removed.

$h'$ is a large share, which fits the plow when the double landside $k$ is attached to it, projecting from the landside $g$ the thickness of the double landside $k$. (See Fig. 4.) The double landside $k$, Figs. 2 and 6, is so made as to fit over the landside of the plow, being fastened to it by screw-bolts $n\ n$. (See Fig. 2.)

$l$ is the mold-board of the plow, which is of one piece with the stock $d$ and landside $g$.

My plow being thus constructed, when a small-sized plow is desired the double landside $k$ is removed from the landside $g$ by unscrewing the bolts $n\ n$. The plow then presents the appearance shown in Fig. 4. The large share $h'$ is then removed by unscrewing the bolt $r$, Fig. 1, by which it is attached to the stock of the plow, and the small-sized share $h$ is substituted in its place. A heavy plow may be readily obtained by replacing the large share $h'$ and the landside $k$.

It is manifest that various sizes of plows may be made from one stock by having double landsides of various sizes and weights with correspondingly-sized adjustable shares.

Having thus described my improvement in plows, what I claim as my invention, and desire to secure by Letters Patent, is—

The use of a double movable landside for increasing the size and weight of the plow, in the manner hereinbefore described.

In testimony whereof I have hereunto set my hand this 19th day of April, A. D. 1858.

JOHN DICKSON.

Witnesses:
MARTIN G. CUSHING,
T. B. DICKSON.